(12) United States Patent
Reid (10) Patent No.: US 7,702,761 B1
(45) Date of Patent: Apr. 20, 2010

(54) NETWORK SWITCHING DEVICE

(75) Inventor: James J. Reid, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 2763 days.

(21) Appl. No.: 09/684,796

(22) Filed: Oct. 10, 2000

(51) Int. Cl.
*G06F 15/173* (2006.01)
(52) U.S. Cl. .................. 709/223; 709/224; 709/229; 709/245; 707/10; 707/104.1; 707/201
(58) Field of Classification Search ................ 709/245, 709/223–229; 707/201, 3, 10, 104.1
See application file for complete search history.

(56) References Cited

U.S. PATENT DOCUMENTS

| | | | | |
|---|---|---|---|---|
| 5,410,688 A | * | 4/1995 | Williams et al. ............... 707/10 |
| 5,448,727 A | * | 9/1995 | Annevelink ................. 707/101 |
| 5,561,793 A | * | 10/1996 | Bennett et al. .............. 707/201 |
| 5,615,367 A | * | 3/1997 | Bennett et al. .............. 707/102 |
| 5,742,284 A | * | 4/1998 | Duggan et al. .............. 719/316 |
| 5,787,442 A | * | 7/1998 | Hacherl et al. .............. 707/201 |
| 6,115,209 A | * | 9/2000 | Araki et al. ............. 360/96.51 |
| 6,230,212 B1 | * | 5/2001 | Morel et al. ................. 709/316 |
| 6,263,347 B1 | * | 7/2001 | Kobayashi et al. .......... 707/201 |
| 6,446,087 B1 | * | 9/2002 | Lai ............................ 707/201 |
| 2002/0099728 A1 | * | 7/2002 | Lees et al. .................. 707/203 |

* cited by examiner

Primary Examiner—Lashonda T Jacobs (57) ABSTRACT

A method of switching between object resources in different storage domains. The method comprises renaming a link to a first object in a first domain with a name of a second object in a second domain, and renaming a link to the second object in the second domain with a name of the first object in the first domain.

13 Claims, 11 Drawing Sheets

| | FIELD NAME | DATA TYPE |
|---|---|---|
| 🗝 | SQL_SERVER_KEY | NUMBER |
| 🗝 | ACCESS_KEY | AUTONUMBER |
| | FIELD1 | TEXT |
| | FIELD2 | TEXT |
| | | |

*FIG. 10A*

| | FIELD NAME | DATA TYPE |
|---|---|---|
| 🗝 | SQL_SERVER_KEY | NUMBER |
| | FIELD1 | TEXT |
| | FIELD2 | TEXT |
| | | |

*FIG. 10B*

| SQL_SERVER_KEY | ACCESS_KEY | FIELD1 | FIELD2 |
|---|---|---|---|
| 0 | 1 | DATA | DATA |
| 0 | 2 | DATA | DATA |
| 0 | 3 | DATA | DATA |
| 0 | 4 | DATA | DATA |
| 0 | 5 | DATA | DATA |

*FIG. 11A*

| SQL_SERVER_KEY | ACCESS_KEY | FIELD1 | FIELD2 |
|---|---|---|---|
| 555 | 1 | DATA | DATA |
| 556 | 2 | DATA | DATA |
| 557 | 3 | DATA | DATA |
| 558 | 4 | DATA | DATA |
| 559 | 5 | DATA | DATA |

NETWORK SWITCHING DEVICE

BACKGROUND OF THE INVENTION

1. Field of the Invention

The present invention relates generally to database systems and, and, more particularly, to shared data resources applications.

2. Prior Art

Figure 1:
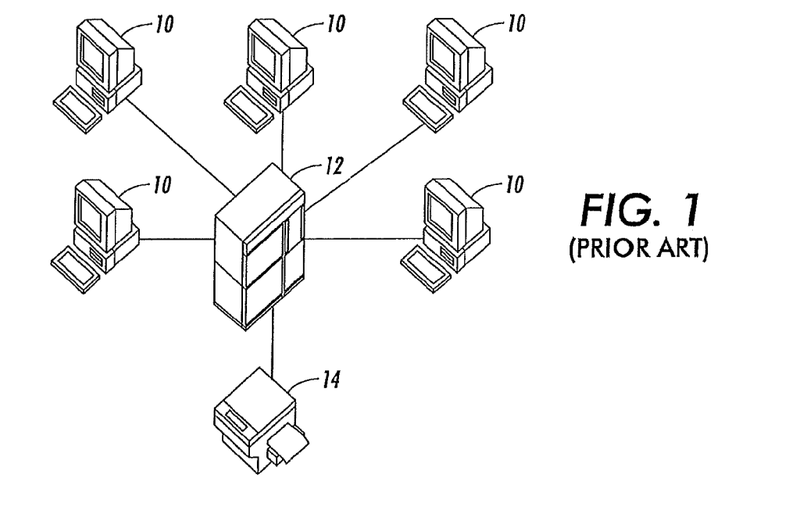
FIG. 1 is a schematic diagram of a shared data resource of the prior art.

Generally, a shared data resource includes a mainframe application using "dumb" terminals. For example, as shown in FIG. 1, dumb terminals or computers 10 are connected to a mainframe computer or server 12. The software applications and data storage reside only on the mainframe computer 12. As shown in FIG. 1, printing takes place through a network printer 14 that is connected to the mainframe 12.

Figure 2:
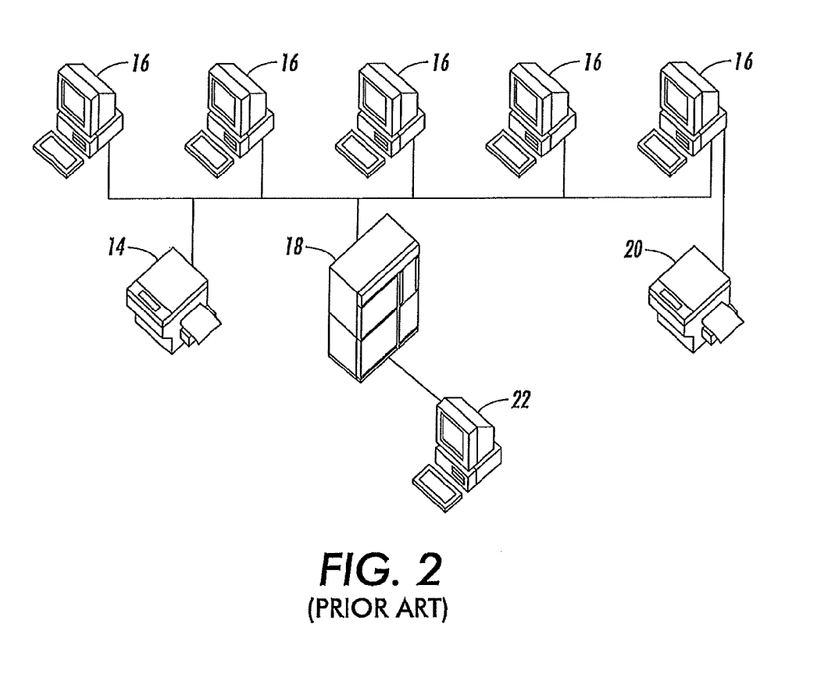
FIG. 2 is a schematic diagram of a shared data resource in a typical client/server application.

Another example of a shared data resource in a client/server application is shown in FIG. 2. Here, the software applications reside on the remote "client" computers 16. The data is not stored on the remote computer, but rather on the network server 18. The application could also reside on the server 18 so that users can run the application from a remote personal computer ("PC") that does not have the application loaded, similar to a mainframe connection. Printing can be accomplished from a local printer 20, or a networked printer 14.

A database management system is software whose function is data storage and reporting. A database stores data in records and fields. These are analogous to rows and columns in a spreadsheet with some important differences. In a database the record/field relationships are predetermined. In a database, a record is generally a collection of information about a single subject, although it could include more than one subject. A field contains the same information about many subjects. Example a name and address list where a record would contain information about a person. The "subject" in this case may be a social security number. The social security number is selected because it is a unique, non-repeating value. This value could be selected as the "key field". That other databases or database tables can use as a field of reference. In a database management system ("DBMS") this reference is called a relationship. The key advantage to a database is that the DBMS stores each record as though it was an individual and unique file. This allows the DBMS to search records on disk by opening a limited number of records at a time. This makes collections of very large amounts of data manageable by any computer with the only restriction being the disk storage medium. Typically, only new data can be added to new records.

Generally, database management system applications may contain attachments or links to tables in other database applications. The term "database" as used herein refers to and is used interchangeably with Database Management System Software, or procedural or event driven application languages such as Structured Query Language ("SQL") or Visual Basic™ that control data processing routines producing output that is stored in data tables. The term "code" refers to a computer language instruction set used to build and control an application.

In a client-server environment, when the client application is an object-oriented application, the client application can have a graphic user interface ("GUI") or display and a set of instructions or code that are contained within that application. The GUI can be linked to object entities in other applications which are not necessarily object-oriented, such as a database table residing on a remote server. The link is effected by creating an object within the client application. The linked object, referred to as an attachment, has a name and a set of attributes that define the method used to link the client to the server application. The attachments may be to database tables in the same computer domain or they may be to remote servers. The remote connection method can provide the user with the ability to communicate with a database shared by others. Also, dynamic linking drivers allow the computers to have different operating systems such as may exist in PC to mainframe communications. The limitation of the remote connection method in a conventional system is the need to have a network connection, Internet server connection, telephone service or a direct connection linking the users PC to the server where the data tables are located when processing data.

Other conventional methods of accessing data from more than one domain can include Microsoft Outlook™. In MS Outlook™, at the login screen the user is given the option of connecting to the network or working locally. In MS Outlook™, in order to change domains, the user must logout then log back in again. Most likely the login selection causes the program to address an alternate set of code. This can be cumbersome where the maintenance of two complete instruction sets for each table is required, particularly where multiple table access is required, such as for example in a Methods-Time Measurement ("MTM") application. The size of the program and the amount of computer memory is also a consideration.

In a MTM application, MTM studies are often done at remote locations such as pilot plants, or at vendors or suppliers business locations. For the analyst to be able to access the needed software, a data port would have to be installed at the remote site specifically for that purpose. Usually, the data port needs to be ordered weeks in advance or optionally, the analyst needs to travel back and forth to their home computer. In addition, all the data acquired tends to be stored in a common domain and these applications do not provide for storage of more than one version of a work process. Thus, data updates in advance of a change cut-in create management problems and the opportunity for error.

SUMMARY OF THE INVENTION

The present invention is directed to, in a first aspect, a method of switching between object resources in different storage domains. In one embodiment, the method comprises renaming a link to a first object in a first domain with a name of a second object in a second domain, and renaming a link to the second object in the second domain with a name of the first object in the first domain.

In another aspect, the present invention is directed to a method of sharing data in a networked communications system. In one embodiment, the method comprises developing data in a data source in a first domain and transferring the data to a data source in the second domain using a link renaming device, wherein the data is accessible in the second domain.

In a further aspect, the present invention is directed to a system for switching between data storage domains. In one embodiment, the system comprises at least one computer device. The computer device can include a control program and two or more database objects for switching. A link to each database object can include a name attribute and an internet protocol address. A copy of the link to each of the database object remains unswitched during a switching process. The computer storage device can also include a user interface coupled to the computer storage domain. The user interface can have one or more menu items including a switch key adapted to execute a switching routine in the switching process adapted to switch a name attribute of a link to one database object with a name attribute of a link to an other database object while the internet protocol address in each link for each database object remains constant.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 3:
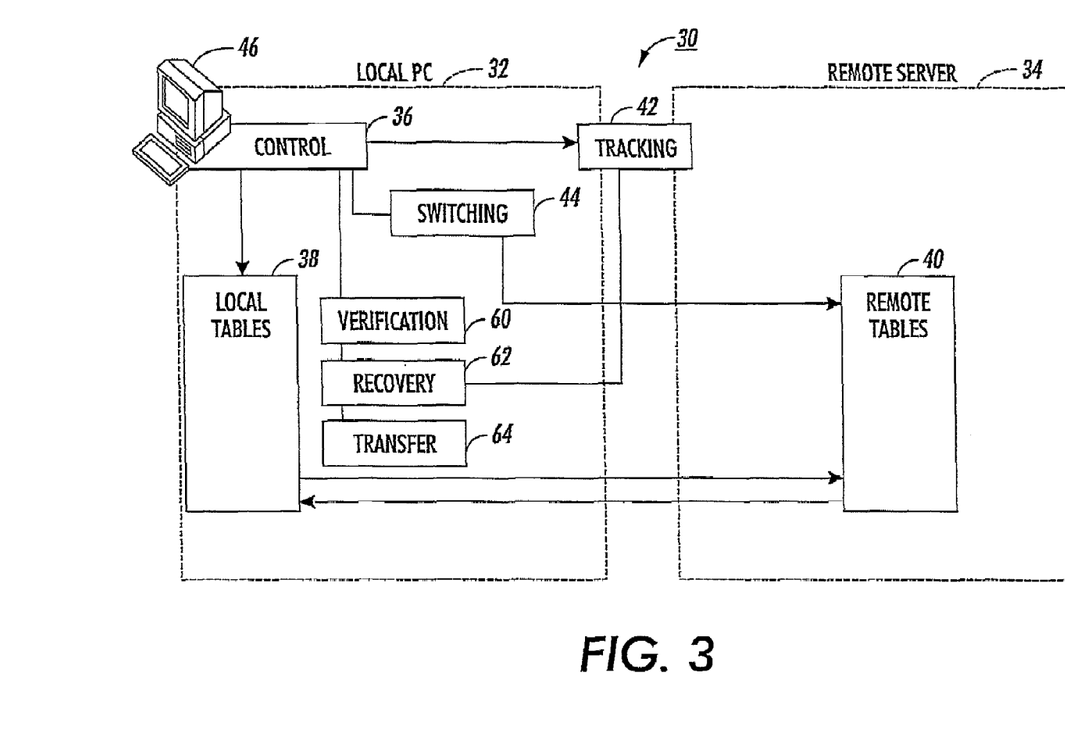
FIG. 3 is block diagram of a system incorporating features of the present invention.

Referring to FIG. 3, one embodiment of a system 30 incorporating features of the present invention can generally comprises a control application 36, a network switching device 44 and one or more local resources or tables 38 on a computing device such as local PC 32. Although the present invention will be described with reference to the embodiments shown in the drawings, it should be understood that the present invention can be embodied in many alternate forms of embodiments. In addition, any suitable size, shape or type of elements or materials could be used.

Figure 4:
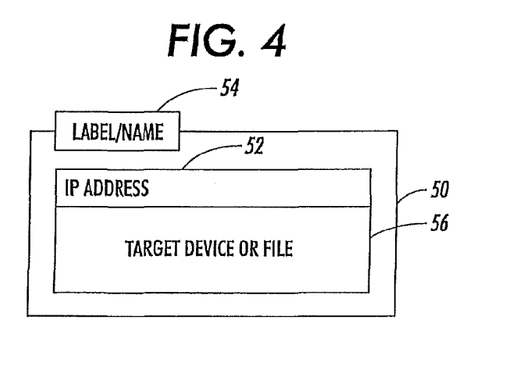
FIG. 4 is a block diagram of a target device or file.

The control application 36 can comprise a local PC, and can include a graphic user interface 46 that can include the set of instructions or code that are contained within the control 36. As used herein, the term "control" is generally used to describe a user interface portion of a client application. In a client-server application, the GUI 46 can be linked to resources or object entities 56, such as for example local tables 38 that reside on the local PC 32. Referring to FIGS. 3 and 4, in one embodiment, the object entities 56 can be remote tables 40 that reside on a remote server 34. The tables 38 and 40 can be the same application as the GUI 46 or different applications. The resources can generally comprise two or more software resources that contain data tables. A first data table resource may reside in the user's local domain 32 and can be referred to as the "local" tables 38. The second and additional data table resources can reside on the remote server (s) 34 and are referred to as the "remote" tables. In alternate embodiments, the remote tables can reside in any suitable domain, including the local domain. Generally, the remote tables represent the data that is to be shared, although any of the tables can serve in that capacity. The structure of the local tables generally mirrors the structure of the remote tables, but can contain different data. Resources can generally comprise database objects that exist in foreign databases different from the control 36 that are linked or attached to the control 36.

Generally, each object 56 has a link 50 that can also be referred to as an attachment. Generally, a link 50 can include a name attribute 54 and an internet protocol ("IP") address attribute 52 as shown in FIG. 4. A name attribute 54 generally includes a file identifier that identifies the file or object, other than the internet protocol address of the file or object. Generally the internet protocol address of the object remains constant while the name attribute 54 can be changed.

A link 50 can also include an instruction set that provides instructions on how to access an object, such as an object link to a remote object. The internet protocol address and instruction set generally identify where the table exists, how to connect to the table and what the table structure is. This can include accessing the table and reading the data in the table. A link is generally stored within the application, which in one embodiment can be located in the remote or client domain, while the table exists in the network or server domain. Generally, the name and IP address attributes of an attachment are independent, and the name attribute 54 of a link 50 to an object 56 can be changed without changing or affecting its IP address attribute or instruction set. It is a feature of the present invention to be able to rename the label attribute 54 of an object 56 while the IP address 52 remains constant.

An object 56 generally includes a target device or file. The IP address tells the control 36 where the object 56 is in the network. The IP address 52 can also be referred to as a network address. If the name attribute 54 of a link 50 to referenced object 56 is changed, the control or client application 36 will no longer be able to "find" that object 50. Changing the name of a link 50 to a different object to the original reference name attribute will cause the client application 36 to look into the new object 50 without having to write additional code or make other changes in the client application 36 or instruction set.

In one embodiment, the control 36 generally comprises a database application with all instruction sets. The control 36 can also include a program or instruction set that launches a switching action and a display that provides a indication of current status. The control 36 generally provides user access to the switching function in the network switching device 44. The control 36 may be integrated with the primary application in the local PC 32, may be separate from the application or executed remotely by way of a pass-through module in another application. The control 36 may also contain the table attachments.

The network switching device 44 is generally adapted to change a link 50 to a current resource by changing a name attribute or object label 54 of the attached resources. The network switching device 4 can also be referred to as a link renaming device. The switching or name changing action of the switching device 44 generally changes the link 50 to tables attached to the primary application by changing their name attributes 54. The primary application is generally adapted to seek data from a preset table address that includes the name attribute 54 of the table. Changing the name of the attached tables cause the application to change its data link 50 without altering its program code. For example, a renaming sequence can be used to change the name attributes of two attached tables as follows:

Beginning Order:
<tablename A>1
<tablename B>2
<tablename A>3
<tablename B>4 wherein the links <tablename A>1 and <tablename A>3 point to table A and the links <tablename B>2 and <tablename B>4 point to table B.

The renaming operation sequence:
rename <tablename A>1 to <tablename X>N
rename <tablename B>2 to <tablename A>1
rename <tablename X>N to <tablename B>2
The resulting ending order:
<tablename B>1
<tablename A>2
<tablename A>3
<tablename B>4 where the links <tablename B>1 and <tablename B>4 now point to table B.

Figure 5:
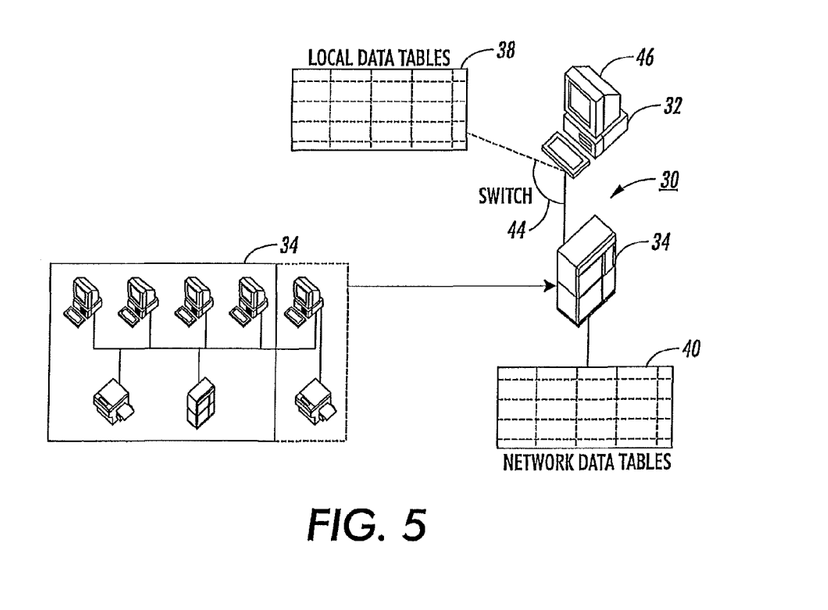
FIG. 5 is a schematic diagram of a shared data resource in a system incorporating features of the present invention.

If additional attachments were present, the rename sequence could step to the next attachment each time the routine was executed, eventually returning to the original order. For example, as shown in FIG. 5, a shared data resource using a network switch device incorporating features of the present invention allows a local PC or domain 32 to switch between local data tables 38 and a remote server 34 which can include network data tables 40.

Figure 6A:
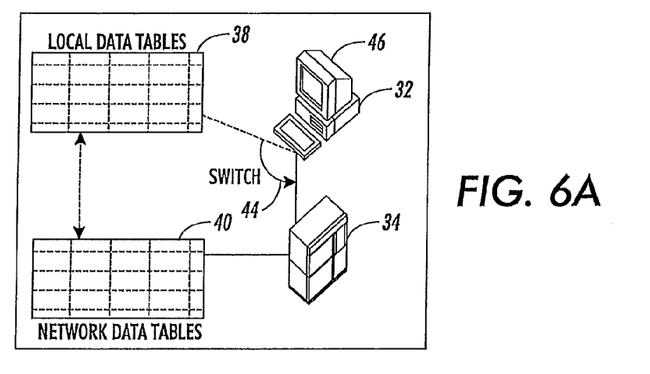
FIGS. 6a-6c are schematic diagrams of data communication options in a system incorporating features of the present invention.
Figure 6B:
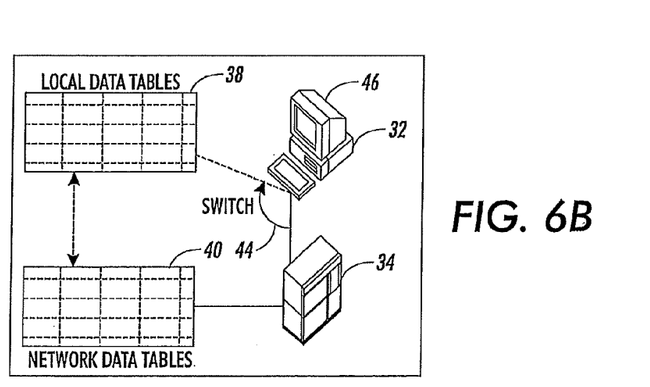
Figure 6C:
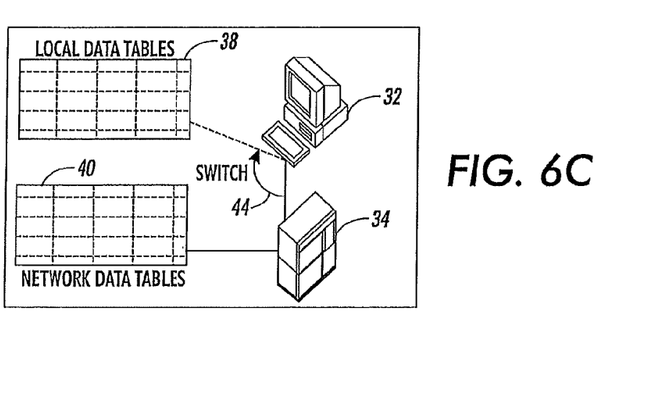

Some examples of data communication options using a network switching device 44 incorporating features of the present invention are shown in FIGS. 6*a*, 6*b* and 6*c*. FIG. 6*a* shows a network 34, selective data exchange with a local domain 38. FIG. 6*b* shows a local, selective data exchange with a network 34. FIG. 6*c* shows a local/stand-alone application.

The control 36 shown in FIG. 3, can also include a tracking application 42 to track the network switching status. The tracking application allows the local PC 32 to keep track of what resources 38 the control 32 is viewing and currently writing to. In one embodiment the tracking application is a table comprising a single record. The table provides the application with memory that can be used to keep track of all statistics relevant to data input and output including any sequencing needed for downloads and verification. One of the fields in the tracking table could be "network", and have a numeric status to indicate which resource is the current data set. The tracking table can be referred to as the "current-status" table.

The control 36 can also include a transfer application or function 64 shown in FIG. 3 that is adapted to transfer data between attached tables. Generally, data transfer is a pass from local to remote tables effected by a code set. In one embodiment, the system 30 allows all tables to be available when networked and the data may simply be appended or copied from one table to its sister table in the target domain. The code set may include safeguards to prevent the same data from being user assessable in more than one domain. However, in alternate embodiments, applications may not require data transfer.

The control 36 can also include a verification application or function 60 that is adapted to verify the integrity of the system and switching status. Generally, the verification function 60 can comprise an algorithm containing a statement that assures that all table label names 54 agree with a tracking indication. For example, a verification query could comprise: IF [tracking#]=0, THEN open query A . . . ).

Generally, each switchable table is attached two times. This generally includes creating a copy of the link 50 to the table. The first attachment or link 50 is for switching during a renaming sequence or routine. The second attachment or copy of the link 50 remains un-switched. In one embodiment, the un-switched attachment can be used for verification. The verification function 60 generally comprises verifying that a switched link is pointing to the same table as the unswitched link of the same table. The verification function or routine 60 can be effected by generating queries. In one embodiment, the queries can be adapted to data in the same table using the switched and un-switched attachment to assure that the links point to the same table. In alternate embodiments, any suitable verification routine to determine if a switched or renamed link is pointing to the proper table can be used. For example, in one embodiment, the verification function 60 can be executed through queries that check for the appropriate existence of a primary key in joined tables.

In one embodiment, the verification function 60 can be adapted to determine if all attachments are properly switched and are within the same domain through a verification query that compares a data value or data in the switched attachment to a data value or data in the unswitched attachment of the same table. The data value can comprise any suitable information, including for example a numerical or alphanumeric value or sequence. The verification process can also use a file in a local controlling application, such as for example the application containing the table links, which contains a numeric value indicating a current switched status of the attachment. This status can be reported to the user on a data access form that the user is viewing. For example, a query may contain text that would appear on the user's data access form or display or a control feature property may be changed on the user's data access form when the switching sequence or algorithm is called, such as a color or visible/not visible icon.

In one embodiment, the verification function 60 can also include a changeable control or data value in the local control application 36 database. The changeable control, also referred to herein as a "switching control" or "control" could hold a value of 1 when a table is attached to the local server 32. When a table is attached to the remote server 34, a value of 2 can be held in its changeable control. This value held in the changeable control can be used to report the currently selected switching option, while the queries described earlier can be used to verify that all switched tables are properly synchronized.

In order to determine if the indication on a user's data access form or display is correct, for example, if the tables are all switched correctly but the indicator did not change, the verification function 60 can be adapted to impose an additional check. A separate field in a table in each domain can be assigned a numeric value for this purpose. This numeric value is different in each domain, but remains constant during the switching process. This second control, also referred to herein as an "unchanging index", verifies the synchronization of the attachments with the indicator that tells the user what table the application is currently accessing. This index control could be a field in an existing table or a separate table used only for this purpose. In an embodiment of the present invention where the index control is a separate table, there is a separate data table in each switched domain. This data table in all domains can be named, for example, "Check". The "Check" table in each domain can contain a single record with a field that contains an index value that does not change, but rather is unique to that domain. The attachment in the local controlling application 32 is switched and named Check, Check1 etc.

For example, in one embodiment of a system 30 incorporating features of the present invention, there are only two domains to switch between. One control domain is in a local area network ("LAN") and the other is on a remote server. When the table being pointed to is in the LAN domain, the control indicator can be changed to "1". When the table being pointing to is within the remote server domain, the control indicator can be changed to a "2".

In one embodiment, using the changeable control and unchanging index to verify that the tables are switched correctly, the number in each "Check" database corresponds to the number held in the local database changeable control. Therefore the sum of both numbers would be the same as two times either number. For example:

For a Local Connection:
Changeable Control=1 and two times Control=2

$$\frac{\text{Unchanging Index} = 1}{\text{Control} + \text{index} \quad = 2}$$

For a Remote Connection:
Changeable Control=2 and two times Control=4

$$\frac{\text{Unchanging Index} = 2}{\text{Control} + \text{Index} \quad = 4}$$

An algorithm for the verification function 60 can be written as:

IF (2[Control]=[Control]+[index] THEN continue ELSE error)

In another embodiment, the changeable control and unchanging index can be used to verify that the tables are switched correctly using the numbers in the previously mentioned "Check" tables in reverse. On the local server the unchanging index can be 2 and on the remote server the unchanging index can be 1. A query can be used to check this relationship in the following way:

For a Local Connection:

$$\begin{array}{ll} \text{Changeable Control} & = 1 \\ \underline{\text{Unchanging Index} \quad = 2} \\ \text{Control} + \text{index} \quad = 3 \end{array}$$

For a Remote Connection:

$$\begin{array}{ll} \text{Changeable Control} & = 2 \\ \underline{\text{Unchanging Index} \quad = 1} \\ \text{Control} + \text{index} \quad = 3 \end{array}$$

In this example any number other than "3" would indicate an error. Therefore, a check algorithm for this verification function 60 can be written as:

IF ([Control]+[index]=3 THEN continue ELSE error)

The control 36 may also include a recovery application or function 62 should an error in the switching be detected. Generally, if the verification function 60 test fails, the recovery function 62 can be invoked to reset all resource attachment names to their original settings. Where a risk of error exists, errors found during verification can be used to trigger a recovery routine. The recovery routine 62 can generally comprise for example, an auto-backup, a display of errors found, and instructions to the user for recovery. Alternately, the appropriate recovery method may vary depending on the complexity of the application. In one embodiment, the recovery function 62 can comprise overwriting the control containing the attachments and status tables, thus resetting them to the default configurations. The recovery function 62 can open a compressed copy of the control that was written to the local domain as part of an install sequence. Replacing the control will not alter data in its attached tables.

Figure 7:
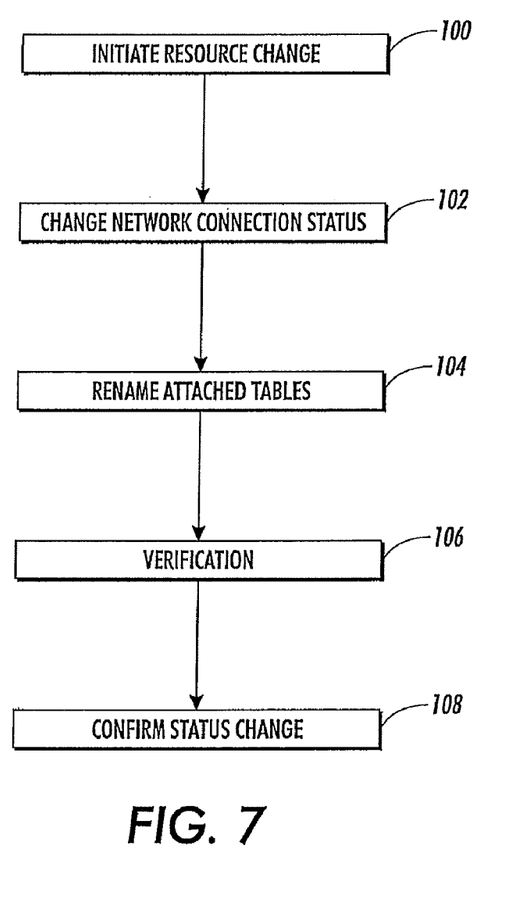
FIG. 7 is a flowchart of an embodiment of a method incorporating features of the present invention.

In one embodiment, a method incorporating features of the present invention is shown in FIG. 7. Generally, the method comprises initiating 100 a resource change from the control 36. The network connection status is changed 102 in the current-status table. The attachments to the tables are renamed 104 and the verification subroutine is executed 106. The status change is confirmed 108 to the user. The method can be applied to any object target, device or file, with a network address and a separate label as attributes.

In one embodiment, a system 30 incorporating features of the present invention can include a switching device 44 which is adapted to re-route a large number of relational table attachments. The switching device 44 can be adapted to rename attached object labels via a macro, or program embedded in the control 36. A second macro can be used to verify that the switching action was completed correctly by keeping and comparing a set of "switched" and "unswitched" attachments to the same tables. For example, a macro action can include verifying the starting point by opening queries that will compare switched table attachments to their unswitched counterparts. Another part of a macro action can include renaming the attachment labels. A further part of the macro action can include comparing the switched attachments to their unswitched counterparts to assure the revised order is correct.

In one embodiment, a system 30 incorporating features of the present invention allows users connected to a networked server, such as for example an Oracle™ server, to develop study documentation while connected to the network, or unplug their laptop computers from the network, go to a remote site and record and study notes in another database application, such as for example a local Access™ table on the PC. The user can then reconnect to the network, send the results to the Oracle™ server and "switch" to the server to complete the study or edit the file. In another embodiment, a user can develop all of their studies in their local PC tables and send only completed studies, or data files to the server. A internal customer could then have the capability using the present invention to view the study or data file using network access such as for example, a web reporting module or such similar network access. Generally, in this embodiment, the system can be adapted to provide a one-way data transfer meaning that once a study or data file is sent to the server "users" may not have the capability to transfer or copy files back onto their PC's, which can eliminate the chance for files to reside in two places at the same time. Edits to the files after server transfer can generally be made only when connected to the server.

In one embodiment of a system 30 incorporating features of the present invention, in a shared data resource system including a network switching device 44 network attachments can be changed for use at remote network locations. For example, as shown in FIG. 5, the system can switch between a network 34 and local data 32 access by clicking a "Change resource connection" button on a change connection screen of the GUI 46. Using the network switching, options may include selecting a "Networked" option and deselecting a "Reset to local at quit" option.

In one embodiment, the user may have the capability to choose between mixed options, such as a "networked" or local option. In this embodiment, data can be developed locally and downloaded to the network drive upon completion. Using a mixed option set can improve the computer response time and allow the user to work with the PC not connected to the network and to download files later when a connection is available. In the mixed mode the responsibility for data integrity can rest on the user. As an example, a download process option may not check for duplicate process numbers. Even though it does check for duplicate elements, the option to overwrite network elements is given to the user.

For example, in a download process, assigned elements and element detail from PC 32 to the shared network 34 drive may comprise the following steps:

From the Home screen, select [Download PC files] . . .
After download, open the shared drive process and check it out to be certain the results you expected were achieved.
Notes: This procedure does NOT check for duplicate PROCESS numbers.
This procedure WILL check for duplicate ELEMENT numbers and if found you would be given an option to overwrite them or to cancel the procedure.
Existing elements on the shared drive that are assigned to a duplicate processes number will remain assigned to the process number along with the new element numbers. (This will keep them from being deleted as orphaned elements during an automatic maintenance procedure)

An example of a download PC process 1K234 having elements 22222 and 33333 assigned to it can be described as follows:

A shared drive process with the same process number has element numbers 55555 and 66666 assigned to it. No duplicates will be found.
After PC to shared drive download, process 1K234 will have the name of the PC file and element numbers 22222, 33333, 55555 and 66666 assigned to it.
An application engineer can study station 020 remotely and download the process, after which, station 010 and 030 will remain intact. This feature anticipates the most common condition where the application engineer does not store data on the PC's local hard drive. The logic used by this procedure will not allow accidental deletion of any elements and will retain element assignments so they will not be deleted as orphaned elements when an automatic maintenance procedure is run.

After the verification process, a database integrity error can be displayed to the user through the GUI 46 a message such as for example, "A serious error has occurred . . . ." This represents a warning issued by the controlling application that it has detected a database integrity problem.

Figure 13:
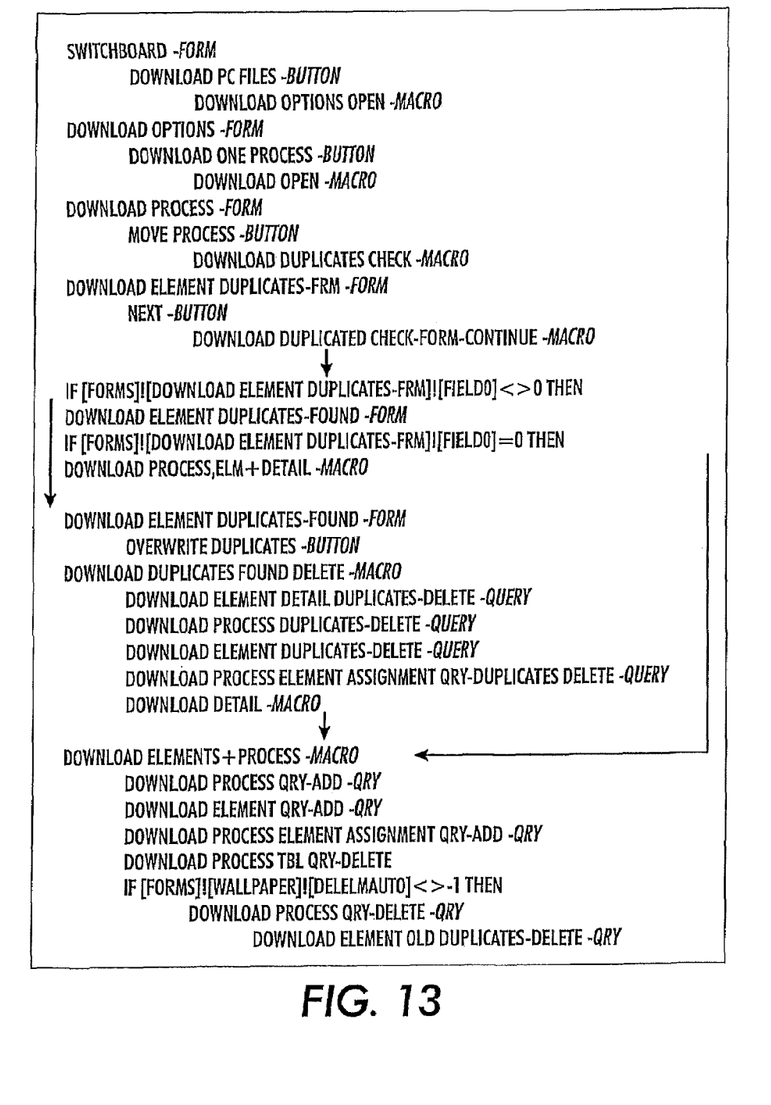
FIG. 13 is a flow diagram of a sequence of operation in a system incorporating features of the present invention.

A sequence of operations to Download PC Files in one embodiment of a system 30 incorporating features of the present invention is shown in FIG. 13.

In one embodiment, a system 30 incorporating features of the present invention can be used for Methods-Time Measurement ("MTM"). Generally, an MTM system can be used to analyze a series of human motions. The charted data can be applied to develop a time value that can be applied to that motion series, representing the time that an operator of average skills will need to complete the task. This analysis can be developed from studying the motions that are needed to complete the task through observation or by studying the work process without observation.

Charted Data: The charted data is embodied in a list of motions and/or motion combinations that is sufficiently detailed so that it can be used to describe all possible human motions. The most basic system is MTM-1. Many other faster handling systems have been developed from the MTM-1 basic data. The time values in the MTM data are expressed in TMU's or Time Measurement Units where 1 hour=100,000 TMU's (1667 TMU/minute).

Figure 14:
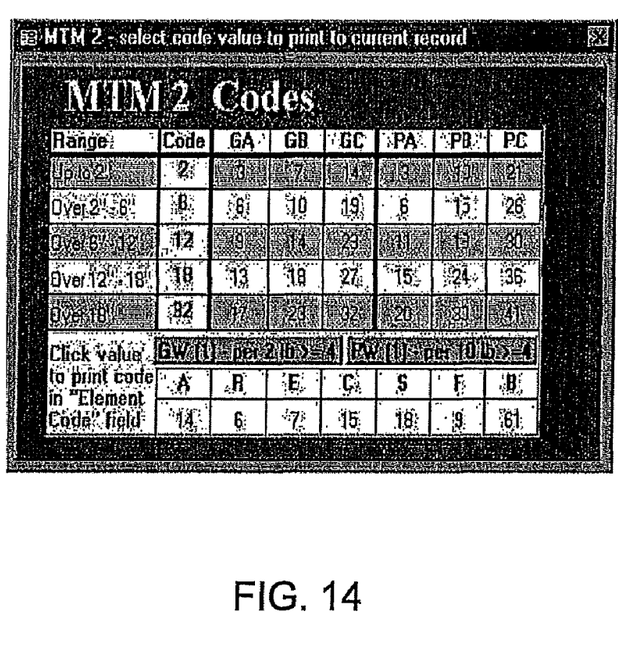
FIG. 14 is an MTM-2 data application chart in accordance with the present invention.

MTM-2 Data: An MTM-2 data application chart is shown in FIG. 14.

Although MTM-2 has largely been replaced by more complex, faster handling systems, it has been used here as an example because it is the most concise and easiest to understand. Across the top are motion codes such a GA, GB, GC . . . PC Down the left is the distance codes. In the motion codes, G=get, P=put the second letter represents the complexity of the motion. To reach 12" to pick up a pen from the table the MTM-2 code would be a GB12. To move the pen 6" with a simple release would be a PA6. Other codes in the table are used to represent object weight, application of force and other body motions.

Computer application of data: Analyzing work cycles using MTM data is a lengthy process. MTM-1 can take an analyst upwards of 200 minutes to analyze 1 minute of work. The MTM-1 analysis method is used to analyze short work cycles. Faster handling systems such as MTM-UAS and UAS-II can yield application speeds of approximately 30 to 1. A computer application that can help organize data and do accurate value lookups can further improve the handling speed of the analysis method producing a typical application ratio of 15 to 1. In many instance data must be stored electronically, but it is not always possible to set up a data connection at the work site. This meant that the applicator would develop data on paper and later have to key it into the computer database.

Data development example: A step takes 18 TMU's, therefore it will take 130 TMU's to walk 20 feet. To get a light part with a simple grasp and place it back down takes 30 TMU's. A series of motions needed to drive a screw using an air driver will typically take 100 TMU's/screw plus 55 TMU's to handle the tool one time. Therefore it will take 255 TMU to drive 2-screws. The completed work-cycle analysis is; An operator picks up a part, walks 20 feet, places the part down and drives 2-screws. This sequence will take 415 TMU's or 14.9 seconds.

Analysis sequence: A typical analysis will require the engineer to travel to the site where the job is being performed, make an observation, then sit down at his/her computer to write up the analysis and apply the data using a specialized software application.

Using the switching device 44 of the present invention, in one embodiment, an analyst can travel to a remote site and, using a laptop computer, develop time standards as needed with or without an intranet connection. Upon connection to the common database, the user can transfer completed files at the appropriate point in time that matches the product release or change cut-in. As an alternative on large new products, it may be desirable to store data on the local domain at the remote site. In these cases the engineer will have an office at the remote site with an Intranet connection so that the user can access the local and remote domains concurrently.

The switching device 44 of the present invention also provides for reuse of common data sequences. A user can develop a sequence that is repeated within a study, store it in their local computer data tables and draw the sequence into another study as needed regardless of the current domain attachment and without cluttering the common domain with these special data cycles. Conversely data cycles that are commonly occur in work cycles can be stored in the common domain. These common cycles can then be accessed by a plurality of users across many domains. Keeping common data in a central database also eliminates the maintenance problems created when the same data is distributed across many domains.

Figure 8A:
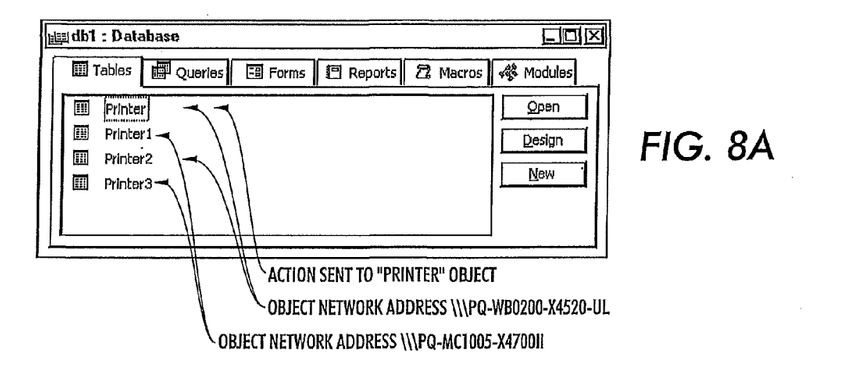
FIG. 8(a) is a schematic diagram of a PC application of a system incorporating features of the present invention.
Figure 8B:
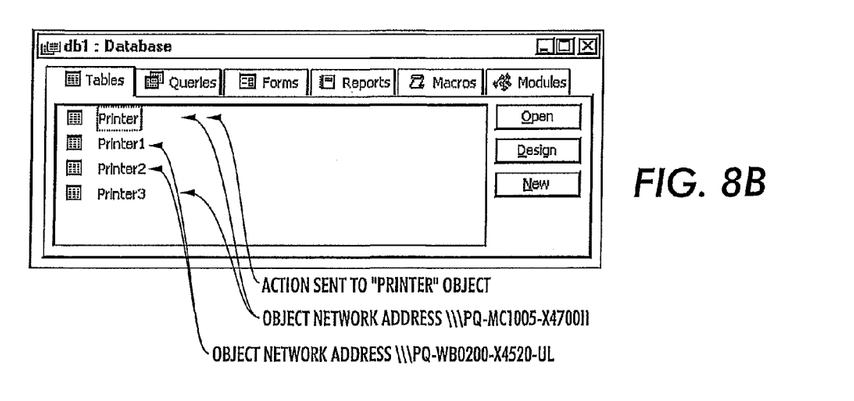
FIG. 8(b) is a representation of a display in one embodiment of a system incorporating features of the present invention prior to a switching action.
Figure 8C:
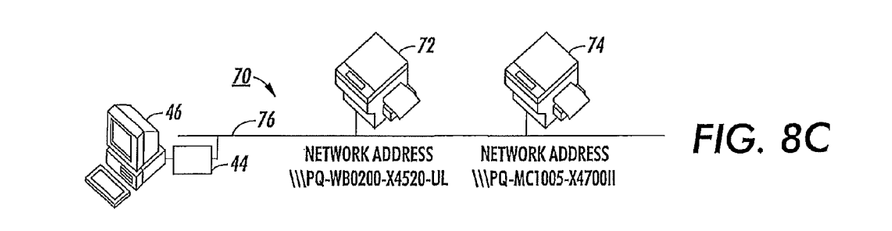
FIG. 8(c) is a representation of a display in one embodiment a system incorporating features of the present invention after a switching action.

In one embodiment, a system 70 incorporating features of the present invention could be used to switch between two printers 72, 74 coupled to a computer or network as shown in FIG. 11. As shown in FIG. 8(a), the system 70 includes a network 76, a computer or GUI 46, which can include the network switching device 44. The two objects for switching are Printer-A 72 and Printer-B 74. The computer 46 can include a control database or program. Each object 72, 74 has a unique network address. Before initiating the switching action as shown in FIG. 8(b), initiating a "print" action will cause the action to be sent to the "Printer" object and be routed to Printer-A 72. After switching, or renaming, as shown in FIG. 8(c), the action will be sent to the "Printer" object, but be routed to Printer B 74.

In another example, in a database including information about a person, conventionally information would be added to a name and address list in the next new record. Once added, the information can be sorted by last name to yield an alphabetical list. A filter can then be applied to pair down the list to show only the people who live in a specific or zip code. A report is then generated as the display medium. In a company employee records the above name and address list may be created and a separate employee information list would be created. The relationship between the two tables could be established through the employee's social security number.

Typically, the employee records for all employees are typically maintained in a central location. However, using the switching device of the present invention, the employee list could be maintained at a local office while payroll information may be maintained at the home office, without a risk of data integrity compromise. This is because a set of non-switched tables keep the relationships while the user can independently access and maintain data for their geographic location, whether connected to the network or not. At the same time all the advantages of a centralized database can be maintained at the central office when connected to the network. Should an employee move from one location to another, the switching device could be used to facilitate records transfer to the new location.

In one embodiment, the network switching device of the present invention can be used for data sharing. For example, using a system incorporating features of the present invention, a user can enter data at a remote site on a stand alone PC workstation not connected to a network or internet, then transfer selected data to a common shared sever so that the data is accessible to all users even if they are not using the same database management system or application. For example, in a new product manufacturing data development application a user can initially begin developing data by searching for similar products and component data on a shared structured query language ("SQL") server. Common data is then copied to the users local PC tables using the network switching device incorporating features of the present invention. Once the data is copied, the user can disconnect from the network to continue data development. In some cases, the user can attach to an isolated LAN server at a remote site in a different domain. In this case the network switching device incorporating features of the present invention can be employed in the data transfer. A foreign server on a LAN, is in some cases, isolated from the Intranet for security reasons.

Once the product is released for production, multiple manufacturing sites worldwide can need to have read/write access to the common information. Data updates to the released product are generally of two types. Data corrections and adjustments can be made in real-time in the SQL environment. Other updates are developed offline on a PC in a local table, then transferred to the SQL server on a specified cut-in date, using the network switching device incorporating features of the present invention. Prior to this invention data was stored in a single common SQL database. In this environment data access had to fit into the security structure of the server with no exceptions and the occasional need for human intervention had to be done by information systems personnel.

In one embodiment of a system incorporating features of the present invention, data transfer protocol can be built into the application by password permissions that are independent from the computer and software permissions. Self-checking algorithms using the un-switched data table links to both domains can be used to enforce the "rules". The basic rule is that the same data files with the same program names can not exist in two places at the same time. The present invention provides a convenient regulatory vehicle for this. Elemental data records may be selectively copied from the SQL server only into valid data files that have been previously created in the user local tables. A buffer table on the users PC can be used to provide this function. An entire data file can not be copied in either direction. An entire data file can be moved from local tables to the SQL tables at the basic user permission level but cannot be moved back. A database custodian has full permissions to move and remove data but still cannot copy data in either direction.

In the data development example, typically data cut-ins could not be completed ahead of time without "rolling" the process numbers. "Rolling" the process numbers refers to changing the process number when the change takes place. In some cases processes would change without affecting parts. Number rolling in these cases caused unnecessary delays and expense. Therefore, for the most part, with only one database, the one data set that was available had to be the one that applied to the current manufacturing process. For this reason, the new process was cut-in and the data was keyed in after that time. In the system incorporating features of the present invention, data updates can be posted at the same time as the process change.

Figure 9:
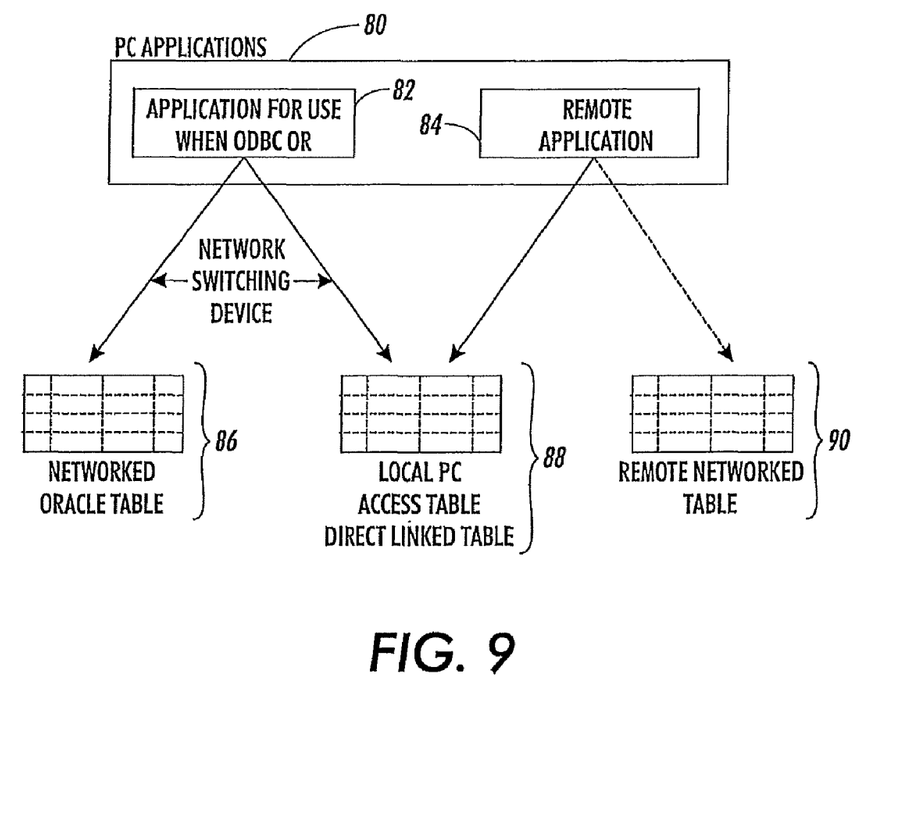
FIG. 9 is a schematic diagram of one embodiment of a system incorporating features of the present invention.

For example, a local PC running MS Access™ and a network SQL server are used. The network server is using Oracle™ as its SQL database. The terms SQL and Oracle are therefore used interchangeably in this discussion although, in alternate embodiments, the present invention is not restricted to use in any particular software. Generally, all of the tables can be attached to the PC application 80 as shown in FIG. 9. The PC application 80 can include an application 82 for use when an OBDC or network connection is present, or a remote application 84 when not attached to an SQL server. In some cases the attached tables can exist on the same computer, or the attached tables can exist on servers attached through a direct or intranet server connection or an ODBC connection. As shown in FIG. 9, a networked Oracle™ table 86 can be connected via an OBDC connection, a Local PC, Access™ table 88 can be connected via a direct link, and a remote network table 90 can be connected through a LAN connection.

Figure 10A:
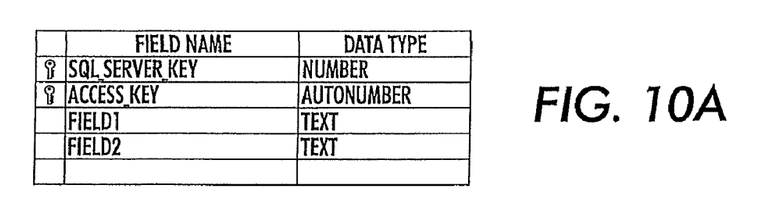
FIG. 10(a) is a representation of an Access™ table design.
Figure 10B:
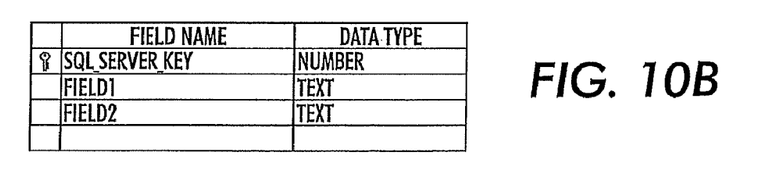
FIG. 10(b) is a representation of an Oracle™ table design.

Generally, the generation of sequence numbers in the key field of the tables can be used to control the display order. For example, in Access™ tables an automatic sequence generator is an available function. In Oracle™, sequence numbers need to be generated by an algorithm. To prevent the possibility of sequence number conflicts, local tables in Access™ can have two fields that are combined to create a unique key field as shown in FIG. 10(a). In an Oracle™ design shown in FIG. 10(b), the Access™ key field is not transferred only one of the fields is displayed. Before a transfer, an update query refreshes the SQL key field numbers in the Oracle™ table of FIG. 9(b).

Figure 11A:
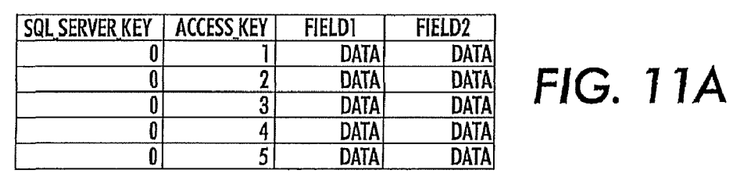
FIGS. 11(a) and 11(b) are representations of an Access™ table design.
Figure 11B:
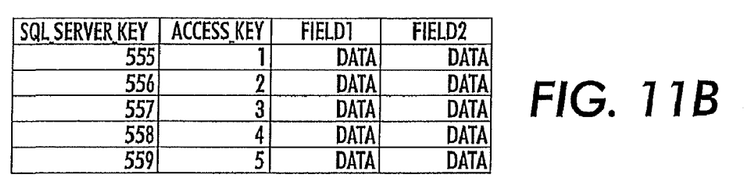

To generate record numbers when not networked the Access™ number generator is used. The SQL server field is populated with zeros (0) as shown in FIG. 11(a). To generate record numbers when networked, script is embedded in the Access™ form as a "BeforeUpdate" Event Procedure. This script will open an Oracle™ pass-through query named "getseq1" which, in turn will generate record numbers in tables in both Access™ and in Oracle™. As new records are added, new sequence numbers are generated. The sequence numbers are then used to maintain the correct display order in the Access™ form as shown in FIG. 11(b). The table in FIG. 11(b) is the same as the table shown in FIG. 11(a) with the server sequence generator running in local mode.

An Access™ pass-through query passes script to an SQL server. The pass-through query may contain SQL code such as:
"SELECT SEQ1.NEXTVAL FROM DUAL;"
Where "DUAL" is a dummy table that exists solely for the purpose of providing a "FROM" target for the SQL statement.
In the Access™ Form the following "Before Update" script is used to call the number sequence:
Private Sub Form_BeforeUpdate(cancel As Integer)
'Set value of line via query
Dim db As Database
Dim rs As Recordset
Set db=DBEngine.Workspaces(0).Databases(0)
If [check]=−1 Then Set rs=db.OpenRecordset("getseq1")
If [check]=−1 Then [Line]=rs!nextval
End Sub
When not networked a error can be returned that causes a separate "on Error" algorithm to return a zero.

In this embodiment of a system incorporating features of the present invention, the Access™ script or a number generator macro will continually generate sequential numbers in the Access™ record number field. When networked the pass-through query is invoked by way of script or a macro. The two fields together are used to create a unique number that serves as the "key field" in Access™ while only the Oracle™ field is used in the server table. This is because the Access™ table can exist without the network creating an opportunity for a key field violation that only exists when not networked. When not networked, the Oracle™ field will generate a repeating default value such as "0" (zero), while an Access™ number generator increments the access line number field.

In this example application certain set rules for data management are enforced by the application structure. In the sample data environment laptop computers can be used for field data development in a secured new program environment. The DBMS can be MS Access™ while the Local tables are MS Access™. When SQL server stores are completed product information can be released. This information must be accessible to a large population of users worldwide and is frequently updated.

Other applications of the present invention may include forms that display different attributes, queries that provide different information displays and macros that provide different executable functions. Tables that contain variable data such as for example multiple fee schedules, Metric and English measurement units, anthropometric variables for human engineering ($5^{th}$ to $95^{th}$ percentile female/male). For example, in one embodiment of the present invention, the system can be used to change form names locally depending on whether the user is viewing a CRT monitor with a 1024× 768 pixel display or a laptop screen with a 800×600 pixel display. Using the present invention to switch a form between the different domains, the form always fits the screen.

Figure 12:
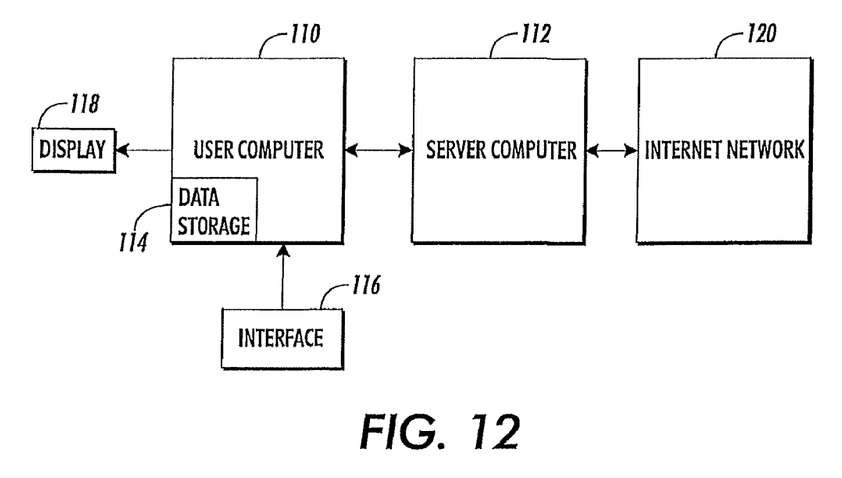
FIG. 12 is a block diagram of an apparatus that may be used to practice the present invention.

The present invention may also include software and computer programs incorporating the process steps and instructions described above that are executed in different computers. In one embodiment, the computers are connected to a network such as an intranet or the Internet. FIG. 12 is a block diagram of one embodiment of a typical apparatus incorporating features of the present invention that may be used to practice the present invention. As shown, a computer system 110 may be linked to another computer system 112, such that the computers 110 and 112 are capable of sending information to each other and receiving information from each other. In one embodiment, computer system 112 could include a server computer adapted to communicate with a network 120, such as for example, the Internet. Computer systems 110 and 112 can be linked together in any conventional manner including a modem, hard wire connection, or fiber optic link. Generally, information can be made available to both computer systems 110 and 112 using a communication protocol typically sent over a communication channel 118 such as the Internet, or through a dial-up connection on ISDN line. Computers 110 and 112 are generally adapted to utilize program storage devices embodying machine readable program source code which is adapted to cause the computers 110 and 112 to perform the method steps of the present invention. The program storage devices incorporating features of the present invention may be devised, made and used as a component of a machine utilizing optics, magnetic properties and/or electronics to perform the procedures and methods of the present invention. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 110 and 112 may also include a microprocessor for executing stored programs. Computer 110 may include a data storage device 114 on its program storage device for the storage of information and data. The computer program or software incorporating the processes and method steps incorporating features of the present invention may be stored in one or more computers 110 and 112 on an otherwise conventional program storage device. In one embodiment, computers 110 and 112 may include a user interface 116, and a display interface 118 or GUI from which features of the present invention can be accessed. The user interface 116 and the display interface 118 can be adapted to allow the input of queries and commands to the system 30, as well as present the results of the commands and queries.

A system embodying features of the present invention generally provides application portability. Generally, the present invention allows a user to window into multiple server databases to search, copy or move information. In a system incorporating features of the present invention, the function of editing information on multiple servers can be made to be word-processing like.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method of switching between object resources in different storage domains comprising:
   creating a copy of a link to a first object in a first domain;
   creating a copy of a link to a second object in a second domain;
   renaming a link to an object in the first domain with a name of an other object in the second domain; and
   renaming a link to the other object in the second domain with a name of the object in the first domain, wherein after the renaming steps each object has an unswitched link and a switched link.

2. The method of claim 1 further comprising the step of verifying that the link to the object in the first domain has been switched with the link to the object in the second domain.

3. The method of claim 2, wherein the step of verifying further includes the steps of:
   comparing a data value in the unswitched link of the first object to a data value in the switched link of the first object; and
   comparing a data value in the unswitched link of the second object to a data value in the switched link of the second object.

4. The method of claim 2 wherein the step of verifying that the name of the link to the first object in the first domain has been switched with the name of the link to the second object in the second domain further includes the step of using a file in a local controlling application that contains a value in a changeable control attribute to indicate a current switch status of the name of the link to first object and the name of the link to the second object.

5. The method of claim 4 wherein the value in the changeable control is assigned a first value when name of the link to the first object is attached to the first domain and a second value when the name of the link to the first object is attached to the second domain.

6. The method of claim 2, wherein the step of verifying further includes the step of assigning a first data value to a field of the link to the first object in the first domain and a second data value to a field of the link to the second object in the second domain wherein the first and second data value are not switched during the renaming steps.

7. The method of claim 1 wherein the links to the first object and the second object each include an internet protocol address and a name attribute, and the steps of renaming include the step of switching the name attribute of the link to the first object with the name attribute of the link to the second object while the internet protocol address for the link to the first object and the internet protocol address for the link to the second object remain constant.

8. The method of claim 1 wherein the first domain is different than the second domain.

9. The method of claim 1 wherein the renaming of the link to the object in the first domain and the renaming of the link to the other object in the second domain effects a transposition to target objects without making copies of or deleting original objects.

10. The method of claim 1 wherein each link being renamed is an existing link.

11. A computer program product comprising:
   a computer useable medium having a computer readable code device embodied therein for causing a computer to switch between objects on different domains, the computer readable code device in the computer program product comprising:
   a computer readable program code device for causing a computer to create a copy of a link to a first object in a first domain and create a copy of a link to a second object in a second domain;
   a computer readable program code device for causing a computer to switch a name of a link to an object in the first domain with a name of a link to an object in the second domain, wherein each object has an unswitched link and a switched link.

12. The computer program product of claim 11, further comprising a computer readable program code device for causing a computer to verify that the name of the link to the object in the first domain is properly switched with the name of the link to the object in the second domain.

13. The computer program product of claim 11 further comprising a computer readable program code device for causing a computer to create a copy of the link to the object in the first domain and a copy of the link to the object in the second domain, wherein each copy is to remain unswitched.

* * * * *